United States Patent [19]
Arnaud

[11] Patent Number: 4,906,361
[45] Date of Patent: Mar. 6, 1990

[54] APPARATUS FOR TREATING FLUIDS

[75] Inventor: Johnny Arnaud, Houston, Tex.

[73] Assignee: Hydrotreat, Inc., Pasadena, Tex.

[21] Appl. No.: 939,697

[22] Filed: Dec. 9, 1986

[51] Int. Cl.$^4$ ............................................. B01D 15/00
[52] U.S. Cl. .................................... 210/189; 210/284; 210/416.1
[58] Field of Search ............... 210/675, 676, 792, 189, 210/257.1, 258, 283, 284, 416.1

[56] References Cited

U.S. PATENT DOCUMENTS

| | | | |
|---|---|---|---|
| 3,549,526 | 12/1970 | Brown | 210/189 |
| 3,554,376 | 1/1970 | Kunz et al. | 210/189 |
| 3,674,685 | 7/1972 | Arden et al. | 210/189 |
| 3,682,312 | 8/1972 | Stevenson | 210/189 |
| 3,731,810 | 5/1973 | Wallmuller | 210/189 |
| 3,878,096 | 4/1975 | Somogyi | 210/110 |
| 3,891,552 | 6/1975 | Prior et al. | 210/190 |
| 4,035,292 | 7/1977 | Himsley | 210/189 |
| 4,443,341 | 4/1984 | Miller et al. | 210/284 |

OTHER PUBLICATIONS

"Ion Exchange with the Amberlite Resins," *Fluid Process Chemical*, a Rohm and Haas publication, pp. 1–16.
"Helpful Hints in Ion Exchange Technology," *Fluid Process Chemical*, a Rohm and Haas publication, Sep. 1981.
"Ion Exchange Primer," a Sybron Corp./Ionac Chemical Company publication (1975): pp. 1–12.

*Primary Examiner*—Ivars Cintins
*Attorney, Agent, or Firm*—Arnold, White & Durkee

[57] ABSTRACT

A method and apparatus for the continuous treatment of fluid with a contact media. The apparatus includes a plurality of vertically arranged chambers through which the fluid flow passes. The contact media may be selectively removed from each chamber and moved to a tank for regeneration. Additionally, the contact media may be selectively moved from one chamber to another.

6 Claims, 14 Drawing Sheets

APPARATUS FOR TREATING FLUIDS

BACKGROUND OF THE INVENTION

The present invention relates generally to methods and apparatus for treating fluids, and specifically relates to methods and apparatus for treating fluids through contact with a contact media. The method and apparatus of the present invention are particularly suitable for use in ion exchange operations where a fluid is contacted with a fluidizable ion exchange media such as a resin, or with filtration or absorption operations where the fluids contacted with a media such as activated carbon.

Ion exchange processes for treating fluids are well known. Such ion exchange operation may include, for example; "water softening", deionization, de-alkylizing, desilicizing, and organic scavenging. With respect to the present invention, these ion exchange processes will for convenience be discussed in terms of water treatment. It should be clearly understood, however, that the methods and apparatus of the present invention may be utilized in the treatments of many other fluids.

Typically, an ion exchange process is affected by flowing the water through a vertical column of an ion exchange contact media, typically a resin. As the water contacts the resin, ions in the water will be attracted to the resin from the water. One type of resin may be utilized to remove cations from the water and a second type of resin may be utilized to remove anions from the water. Preferably, the separate resins will be contained in separate beds. However, conventional techniques of water deionization include the use of two resins mixed in a single bed.

The softening of water by ion exchange is accomplished by replacing the calcium and magnesium ions in the water by an equivalent number of sodium ions from the resin. Resin in the bed will contain only a finite number of exchangeable sodium ions. This number defines the "capacity of the resin". When the capacity of the resin has been exhausted, i.e., when all of the exchangeable sodium ions on the resin have been replaced by calcium and magnesium ions from the water, the resin must be regenerated back to the sodium form. This regeneration is typically accomplished by passing a sodium chloride solution (a brine) through the resin. Additionally, the resin will be rinsed to remove excess brine, and will be backwashed to remove particulate matter which may have accumulated in the resin during the ion exchange step ("the service cycle").

As water flows through a bed of resin, the majority of the ion exchange will take place in the portion of the resin which is first contacted by the fluid. In an ion exchange system where the fluid flows downwardly through the bed, this exchange creates an "exhausted band" of exhausted resin which expands downwardly through the bed as the operation continues. When the band approaches the bottom of the resin bed, the bed must be regenerated as discussed above.

Additionally, a vertical column of resin operating in a service cycle has an exchange zone, or active band, starting at the top and moving down through the bed of resin. The width of the active band varies with certain operating parameters of the system. For example, as the service flow is increased the active band will spread out. The resin bed must be removed from service and regenerated before the active band reaches the bottom of the column to prevent leakage of the ions being removed from the fluid. This prevents full utilization of the resin since there is resin not fully exhausted in and below the active band. When a column of resin in normal operation is regenerated, sufficient regenerant (salt in the case of water softening) is used to regenerate the entire volume regardless of what percent of the bed was actually exhasted.

Many conventional vertical ion exchange columns are designed to function both as a column for the service cycle, i.e., for the initial ion exchange process, and for the regeneration cycle, and therefore also include provisions for backwashing, regeneration, and rinsing of the resin. This structure requires the fluid influent to be shut off from the column while the regeneration operation takes place, thereby interrupting the supply to service of treated fluid. When an uninterrupted supply of treated fluid is required, a second vertical column is typically provided. This second column will be regenerating during the service cycle of the first column and vice versa. Conventional columns typically include a shell to contain the resin, a support for the resin, and means for distributing flow both upwardly and downwardly through the resin, (for both the service cycle and the regeneration and backwashing cycles). The shell must have sufficient space above the resin to allow the resin to expand during the backwashing operation. Valves and controls are typically necessary to bypass "raw" (untreated) fluid around the column during the regeneration cycle, to inject the regeneration fluid into the column, and to reverse the direction of fluid flow for backwashing.

Conventional vertical columns may include several disadvantages. Where a single large resin bed is utilized, fluid has a tendency to channel through the bed during periods of low flow rate, thereby reducing the effective contact of the fluid with the resin. Additionally, the requirement of additional space above the resin bed to facilitate the backwashing operation adds cost to the vessel. Where uninterrupted service is required and a second unit is provided, the additional unit adds significant cost and size to the unit. A significant factor in this cost is that a control valve must be provided to switch fluid flow from one vessel to the other. This control valve must be large enough to provide a significant flow of the influent into the column without placing an excessive pressure drop in the system. Large control valves of this type typically contribute a significant portion of the cost of conventional ion exchange units. These valves still often place an undesireable pressure drop in the system.

If only one column is provided, in typical conventional systems, not only must the flow of treated water be interrupted, but untreated water must be used with the unit itself for the backwashing, regeneration, and rinsing operations. This use of untreated water will, in itself, decrease the operating efficiency of the contact media regeneration, and will therefore similarly decrease the efficiency of the ion exchange process.

Because of the deficiencies discussed above, several attempts have been made to devise methods and apparatus for an uninterrupted or, continuous ion exchange process in a single column. Typically, these processes involve the movement of the contact media downwardly through the column or ion exchange vessel while the fluid flows upwardly through the column. In some cases, the resins are actually fluidized, or suspended, in the fluid flow. This upward flow, and especially fluidization, typically provide less than optimal ion exchange. A major factor in the efficiency of ion exchange process is the physical contact of the water molecules with the resin. With a downward fluid flow, both gravity and the influent flow serve to compact the resin into a tightly formed bed. This compacting of the bed forces the fluid to flow closer to the resin beads, causing surface effects on the water and forcing fluid to flow into the pores of the beads. This compacting of the bed, therefore, increases both contact efficiency and the bed capacity. In contrast, an upward flow, as found in the prior art, causes the resin to expand, as noted above, sometimes to the point of fluidization. This unpacked state of the resin causes a reduction in contact with the water. Additionally, even when a system is designed to operate with the resin not in a state of fluidization, flow rate surges must be prevented to avoid the fluidization.

As indicated above, conventionally proposed continuous ion exchange methods and apparatus typically move the resins downwardly through the exchange vessel. When each portion of the resin reaches a predetermined location in the vessel, the resin is removed and regenerated in a separate vessel. Therefore, for efficient use of the system and the contact media, the rate of travel of the media must be regulated in response to the rate of flow of the influent.

Conventionally proposed methods and apparatus for continuous ion exchange typically provide for contacting the fluid with a single resin in a vessel. However, for operations such as water deionization or demineralization, the water is typically contacted with two ion exchange resins in two stages. In the first stage, the water contacts a first resin which will attract the cations from the water and replace them with hydrogen ions. This first resin is typically regenerated with an acid. In the second stage, the fluid is contacted with a second resin which attracts the anions from the water and replaces them with hydroxide ions. This second resin is typically regenerated with a base, such as sodium hydroxide. The hydrogen ions from the first stage and the hydroxide ions from the second stage combine to produce water. Similarly, fluid may be contacted with selected resins for other treatment operations, such as dealkylization, etc. Each of these resins will require a selected regenerization fluid. The fluid must, therefore, be treated with the different resins in different columns or with a mixture of the two resins. If a mixture of the resins is utilized, then the resins must be separated prior to regeneration.

Additionally, activated carbon is often utilized in fluid treatment operation. The activated carbon may be used to remove gases and other organic impurities giving taste and odor to drinking water. Activated carbon may be used as a pretreatment for water supplied to water softening systems to prevent organic fouling of the resin beds, and may also be utilized in waste water treatment. Although activated carbon is not susceptible to being "regenerated" per se, the carbon periodically requires backwashing to remove suspended matter and to re-grade the bed. With conventionally proposed continuous water treatment operations, an activated carbon section must be contained within a separate vessel.

Accordingly, the present invention provides a new method and apparatus for the continuous treatment of fluids in a single column wherein the contact media need not be treated until it is completely exhausted. Additionally, multiple contacting media may be utilized for different types of ionic exchange, absorption or filtration in the column, and each may be regenerated without interrupting the continuous service flow. Also, this continuous fluid treatment can be performed with an optimal downward fluid flow. The invention, thus, significantly overcomes the deficiencies presented by the prior art.

SUMMARY OF THE INVENTION

The present invention provides a new method and apparatus for the treatment of fluids where the fluid is treated by bringing it into contact with a contact media. An apparatus in accordance with the present invention includes a treatment vessel in which the fluid treatment will occur. This treatment vessel preferably includes a plurality of vertically arranged chambers. Advantageously, these chambers are arranged in vertical alignment, such that fluid flowing from one chamber will flow directly into the next chamber. Each chamber includes, and is preferably at least partially defined by, members which will retain the media in the chamber but which will allow fluid to flow through. An apparatus in accordance with the present invention will also include a media treatment vessel which is selectively in fluid communication with preferably each chamber in the treatment vessel. The media treatment vessel may physically be a portion of the fluid treatment vessel, but will be isolated therefrom except for the selective fluid communication. The apparatus will also include a fluid transfer system preferably adapted to selectively transfer fluid from any one of the chambers in the fluid treatment vessel to another chamber, and to transfer the contents of any chamber from that chamber to the media treatment vessel.

In a particularly preferred embodiment, the transfer system will include a plurality of manifolds, each manifold including one or more valves. In this particularly preferred embodiment, conduits will be cooperatively arranged with each valve in the manifold to direct fluid from a conduit source through the manifold either through another valve or through a manifold port. Also in this particularly preferred embodiment, a plurality of pumps will be utilized to physically move the fluid during a media transfer operation. The first pump will typically be utilized to draw fluidized media from the media treatment vessel, while a second pump will be utilized to draw fluidized media from one of the chambers in the fluid treatment vessel into the media treatment vessel.

In operation, this allows fluid to be continuously treated in one or more chambers within the fluid treatment vessel while a portion of the contact media is either being treated, such as being ionically regenerated, in the media treatment vessel, or is being transferred into a chamber in the fluid treatment vessel. Additionally, slugs of the contact media may be transferred from one chamber in the fluid treatment vessel to another as desired. All these transfer operations may be either controlled manually or may be subject to automatic control.

BRIEF DESCRIPTION OF THE DRAWINGS

FIG. 1 schematically depicts a fluid treatment system in accordance with the present invention in a service cycle, with no contact media being regenerated or transferred.

FIG. 2 schematically depicts the fluid treatment system of FIG. 1 wherein contact media from an uppermost chamber is being transferred to a media treatment vessel.

FIG. 3 depicts the fluid treatment system of FIG. 1 as contact media is being transferred from one chamber to another in the fluid treatment vessel.

FIG. 4 depicts the fluid treatment system of FIG. 1 as contact media is being transferred from one chamber in the fluid treatment vessel to another chamber.

FIG. 5 depicts the fluid treatment system of FIG. 1 as contact media is being transferred to the next adjacent chamber in the fluid treatment vessel.

FIG. 6 depicts the fluid treatment system of FIG. 1 as a slug of contact media is being transferred from the media treatment vessel into a chamber in the fluid treatment vessel.

FIG. 7 depicts the system in a service cycle, wit no contact media being regenerated or transferred.

FIG. 8 depicts the fluid treatment system of FIG. 7 as contact media is being transferred from the fluid treatment vessel into the media treatment vessel.

FIG. 9 depicts the fluid treatment system of FIG. 7 as contact media is being transferred from one chamber in the fluid treatment vessel to a transfer vessel.

FIG. 10 depicts the fluid treatment system of FIG. 7, as the slug of contact media is being transferred from a transfer vessel into a chamber of the fluid treatment vessel.

FIG. 11 depicts the fluid treatment system of FIG. 7, as contact media is being transferred from the media treatment vessel into a chamber in, a fluid treatment vessel.

DETAILED DESCRIPTION OF PREFERRED EMBODIMENTS

Figure 1:
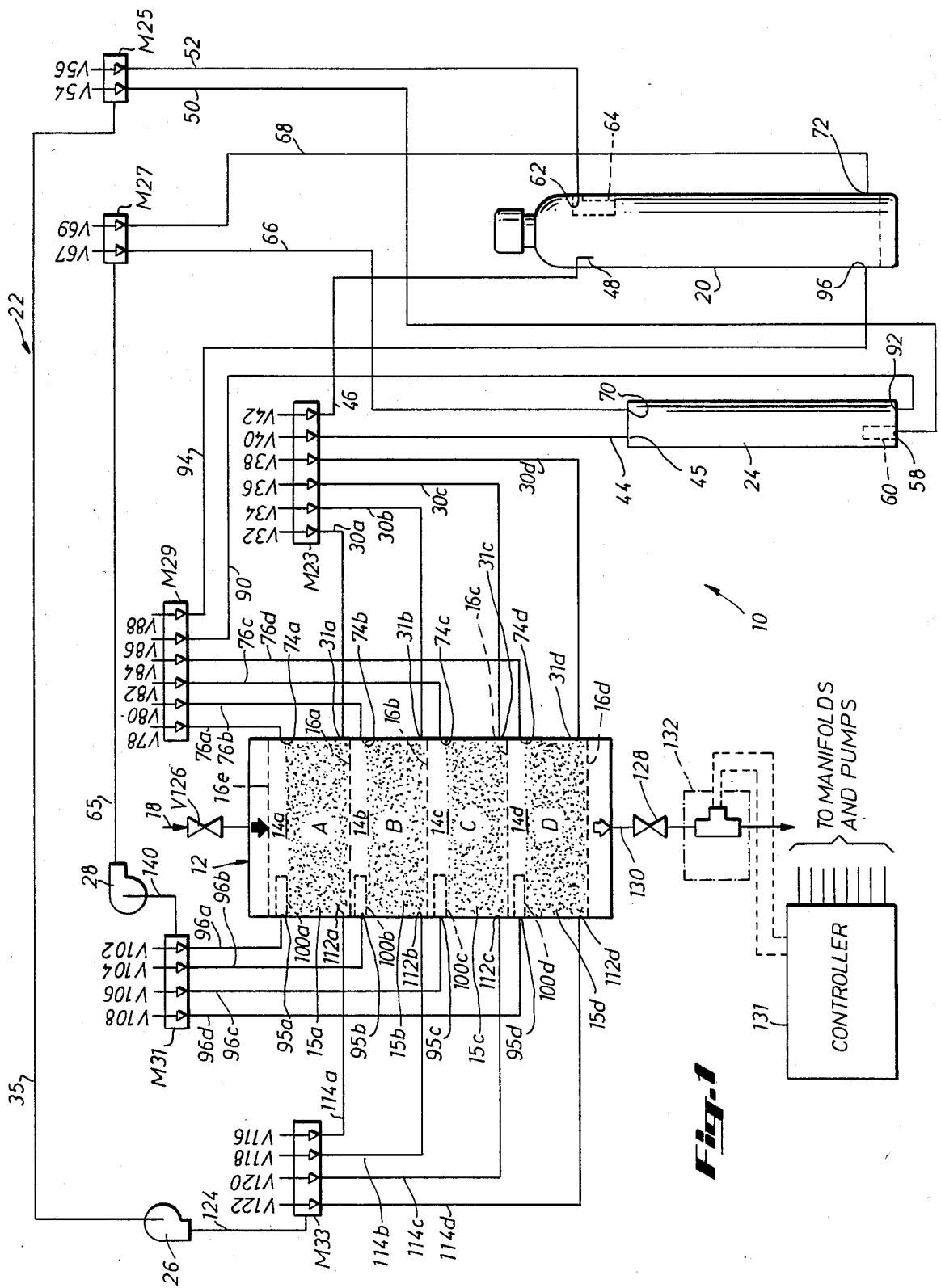
FIGS. 1–6 schematically depict a first embodiment of a fluid treatment system in accordance with the present invention in various stages of one exemplary method of operation of the system.

Referring now to the drawings in more detail, and particularly to FIGS. 1-6, therein is depicted in schematic representation, in each figure, a fluid treatment system 10 in accordance with the present invention. FIG. 1 depicts fluid treatment system 10 in a service cycle, such as at an initial start of operation. FIGS. 2-6 depict fluid treatment system 10 during one type of an anticipated continuous fluid treatment operation.

System 10 includes an exchange column 12 which houses a plurality of contact media beds. As indicated earlier herein, these contact media beds may be formed of various substances, such as different resins or activated carbon, etc. For purposes of illustration, system 10 will be described as having four beds, each composed of a single type of resin. As depicted in FIG. 1, each chamber 14a-14d includes a bed formed of a slug 15a-15d, respectively, of resin. In this preferred embodiment, exchange column 12 includes a plurality of apertured plates 16a-16e, which define the upper and lower boundaries of the four chambers. Aperture plates 16a-16d each support one of the resin slugs, 15a-15d respectively. Aperture plate 16e serves to distribute influent from inlet 18 evenly across slug 15a. Additionally, as will be seen later herein, aperture plate 16e serves as a "lid" to chamber 14a to keep resin slug 15a in chamber 14a just as apertured plate 16a serves as a lid to chamber 14b. Exchange column may be of a size appropriate for the particular application for which it is utilized. Accordingly, exchange column may range in diameter from several inches to several feet.

Fluid treatment system 10 includes a media treatment vessel or tank, such as regeneration tank 20. Regeneration tank 20 is preferably a conventional regeneration tank suitably sized for regeneration of the volume of resin contained in one resin bed 15a-15d. Regeneration tank 20 will be coupled to sources of an appropriate regeneration fluid in a conventional manner. The controls for regulating the flow of the regeneration fluids may also be regulated by conventional controls.

Column 12 and regeneration tank 20 are interconnected by a fluid and resin transfer system, indicated generally at 22. In one particularly preferred embodiment, transfer system 22 includes a transfer vessel or tank 24, pumps 26 and 28, manifolds, and a plurality of "lines", or conduits. Transfer tank 24 is preferably appropriately sized to retain the volume of a resin slug 15a-15d as found in one resin bed in column 12. In one particularly preferred embodiment, transfer system 22 includes six manifolds, M23, M25, M27, M29, M31, and M33. Each manifold M23, M25, M27, M29, M31, M33 includes a plurality of valves. As will be described in more detail later herein, each valve is situated in a flow path formed by at least one conduit. These manifolds and the conduits provide a mechanism for selectively interconnecting exchange column 12, regeneration tank 20, transfer tank 24, and pumps 26 and 28. These selective interconnections, and the resulting creation of flow paths, facilitate the selective movement of fluid (and fluidized resin) from one portion of system 10 to another portion. As will be apparent from the discussion to follow, pumps 26 and 28 should be selected as to provide a sufficient flow rate of fluid to fluidize the resin or other contact media in chambers 14a-14d.

As will be apparent from the discussion to follow, each manifold M23, M25, M27, M29, M31, M33 may be of similar construction, differing primarily in the number of valves provided for. The purpose of each manifold is to allow the opening of one or more valves in the manifold, to conduct either fluid or fluidized resin to a desired location.

In fluid treatment system 10, column 12 includes a Resin-Out line 30a, 30b, 30c, 30d, communicating with each chamber, 14a-14d, respectively. Each Resin-Out line 30a-30d preferably communicates a resin outlet 31a-31d in lower portion of its respective chamber, 14a-14d, to a valve V32, V34, V36, or V38, respectively, in manifold M23. Manifold M23 also contains valve V40 which communicates through line 44 with transfer tank 24. Additionally, manifold M23 includes valve V42 which communicates through line 46 with inlet 48 of regeneration tank 20.

Manifold M25 couples lines 50 and 52, through valves V54 and V56, respectively, to manifold port 35. Port 35 communicates with the inlet of pump 26. Line 50 is coupled to fluid exit 58 of transfer vessel 24. Fluid exit 58 is protected by a strainer 60 to prevent the flow of resin through line 50. Line 52 is connected to fluid exit 62 of regeneration tank 20. Fluid exit 62 is similarly protected by a strainer 64 to prevent the flow of resin through line 52.

Manifold M27 selectively couples manifold port 65 to lines 66 and 68. Manifold port 65 communicates with the outlet of pump 28. Line 66 is coupled to fluid inlet 70 of transfer tank 24, while line 68 is coupled to fluid inlet 72 of regeneration tank 20.

Referring again to the fluid connections with exchange column 12, each chamber 14a–14d includes a resin inlet 74a–74d coupled through a respective Resin-In line 76a–76d to valves V78, V80, V82, V84, respectively, in manifold M25. Each resin inlet 74a–74d is preferably an upper portion of its respective chamber 14a–14d to facilitate the free transfer of resin through the line. Manifold M29 also includes valves V86 and V88. Valve V86 is connected to line 90 which is coupled to resin outlet 92 of transfer tank 24. Valve V88 is coupled to line 94 which is in turn coupled to resin outlet 96 of regeneration tank 20.

Each chamber bed 14a–14d of vessel 12 also includes a fluid outlet 95a–95d coupled to a Fluid-Out line 96a–96d, respectively. Fluid outlets 95a–95d are again protected by strainers 100a–100d to allow the passage of fluid, but to prevent the passage of resin into Fluid-Out lines 96a–96d. Fluid-Out lines 96a–96d are coupled to valves V102, V104, V106, and V108, respectively, in manifold M31. Manifold M31 also includes a port 140 coupled to the inlet of pump 28.

Each chamber 14a–14d of column 12 also includes a fluid inlet 112a–112d, respectively. Each fluid inlet 112a–112d is coupled through a respective Fluid-In line 114a–114d to a valve V116, V118, V120, and V122, respectively, in manifold M33. Manifold M33 includes a port 124 which is connected to the outlet of pump 26.

Influent passes into system 10 through fluid inlet 18. A valve V126 is preferably placed in fluid inlet 18 to provide a master control for the flow of untreated fluid into fluid treatment system 10. Similarly, a control valve V128 will preferably be placed at fluid exit 130 to provide a master shut-off of treated fluid from fluid treatment system 10.

In operation of system 10, the valves in manifolds M29 and M23 will have fluidized resin (or another contact media) flowing through them. Accordingly, it is preferable that these valves be of a design which will minimize damage to any media particles which might be in a valve when it closes. For example, valves wherein the sealing is effected at essentially a line-sealing surface will be less likely to crush particles then would a valve having a broad sealing surface. All valves in the manifolds may be manually operated. Preferably, however, system 10 will be operated automatically by a controller 131. Such automatic control may be provided by conventionally known mechanisms, such as microprocessor controls or mechanical controls. All valves in the manifolds may be individually operated by a variety of mechanisms, such as pneumatic or hydraulic controls, or electrical solenoids depending upon convenience and economy for a particular application. Where the operation of fluid treatment system 10 is to be controlled automatically, the controller 131 (microprocessor, etc.) may be utilized to operate the manifold valves and pumps through conventional actuation mechanisms for the particular system involved.

Additionally, the operation of system 10 may be controlled in response to various parameters, such as flow rate, time, etc. One particularly preferred means for controlling the operation of fluid treatment system 10 will be in response to a predetermined flow volume through exchange vessel 12. In many applications, the time that a resin bed is nearing exhaustion may be anticipated from the volume of fluid which is passed through the resin bed. Accordingly, where automatic control is to be initiated in response to a flow of fluid, a conventional flow meter 132 will be placed at fluid outlet 130. Upon measuring a predetermined flow volume, the output of flow meter 132 may be utilized to initiate system operations. Those skilled in the art will recognize that, alternatively, conventional sensors may be utilized in chambers 14a–14d to sense the condition of the fluid in the chambers and to thereby evaluate the condition of the contact media. The output of these sensors can also be utilized to initiate system operations.

Figure 2:
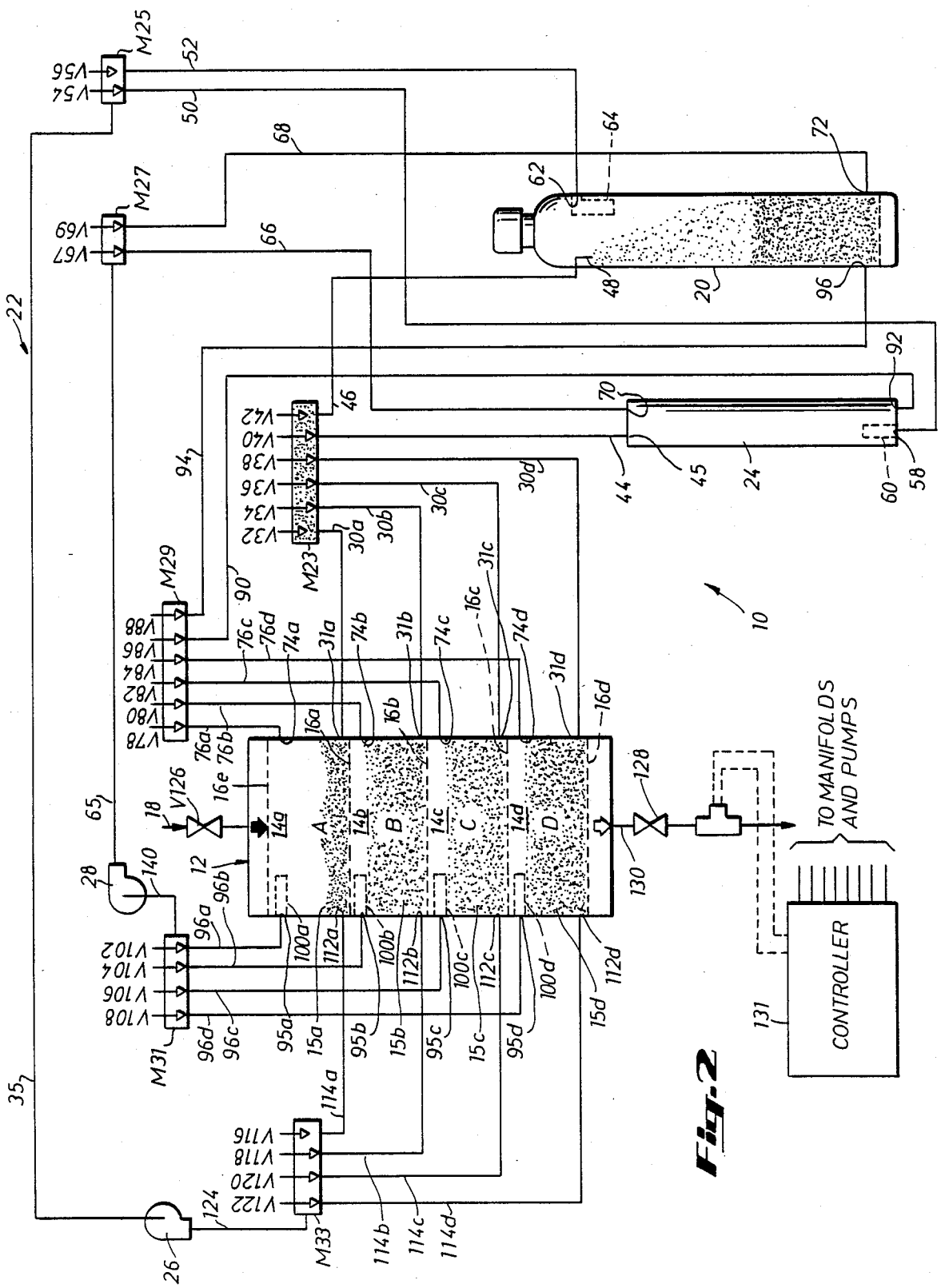

Fluid treatment system 10 provides for a resin slug 15a–15d to be removed from its chamber 14a–14d in column 12 and to be regenerated in regeneration tank 20 without interruption of fluid flow through column 12. Referring now to FIG. 2, therein is depicted fluid treatment system 10 when resin slug 15a from chamber 14a is being removed from column 12 and placed in regeneration tank 20. To achieve this result, valves V32 and V42 in manifold M23 are opened to provide a path for resin in chamber 14a to reach regeneration tank 20. Similarly, valve V56 in manifold M25 and valve V116 in manifold M33 are opened to provide a path for the fluid from regeneration tank 20, back into chamber 14a, in column 12. Simultaneously with the opening of these valves, pump 26 is activated. Pump 26 forces fluid through valve V116 and fluid inlet line 114a into chamber 14a. The input of this fluid fluidizes resin slug 14a in chamber 14a. The fluidized resin is then carried by the fluid through Resin-Out line 30a through manifold M23 and through line 46 into regeneration tank 20. Pump 26 will operate until all resin is moved from chamber 14a of column 12 into regeneration tank 20. At such time, valves V32, V42, V56, and V116 will be closed and pump 26 will be deactivated. At this time, regeneration of resin slug 15a may proceed in a conventional manner. The same control mechanism which deactivates (closes) the aforementioned valves, may be utilized to initiate the regeneration cycle.

System 10 is further capable of allowing resin to be transferred from one chamber 14a–14d in column 12 to another whenever such transfer is desired. This transfer is accomplished essentially independently of the flow of fluid from inlet 18 through exchange column 12. In many applications, such as water softening operations, while exhausted resin is being regenerated, it will be optimal to move the resin from each chamber 14a–14d to the next highest chamber so that the regenerated resin may be placed in the lowest chamber.

Figure 3:
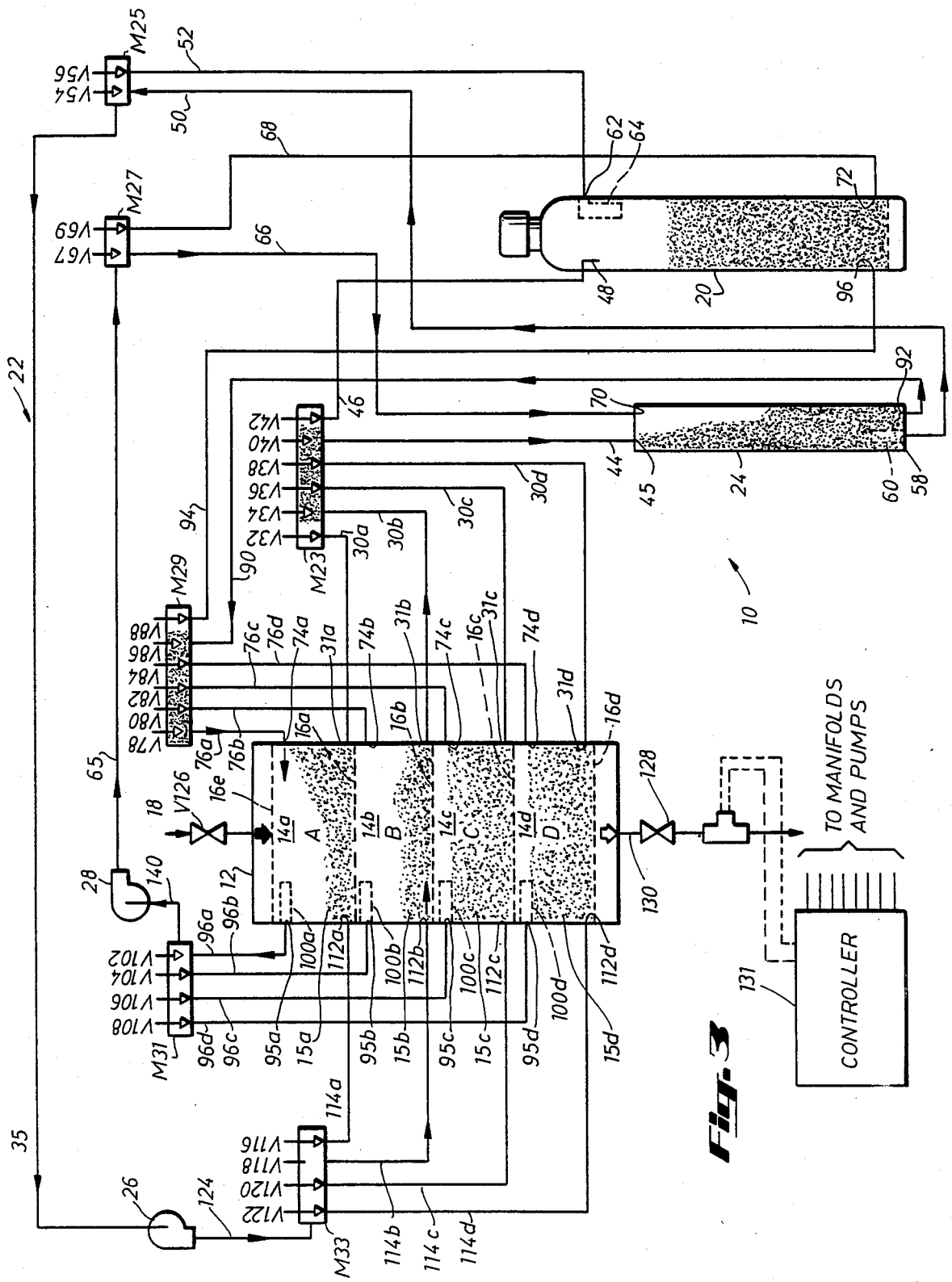
Figure 4:
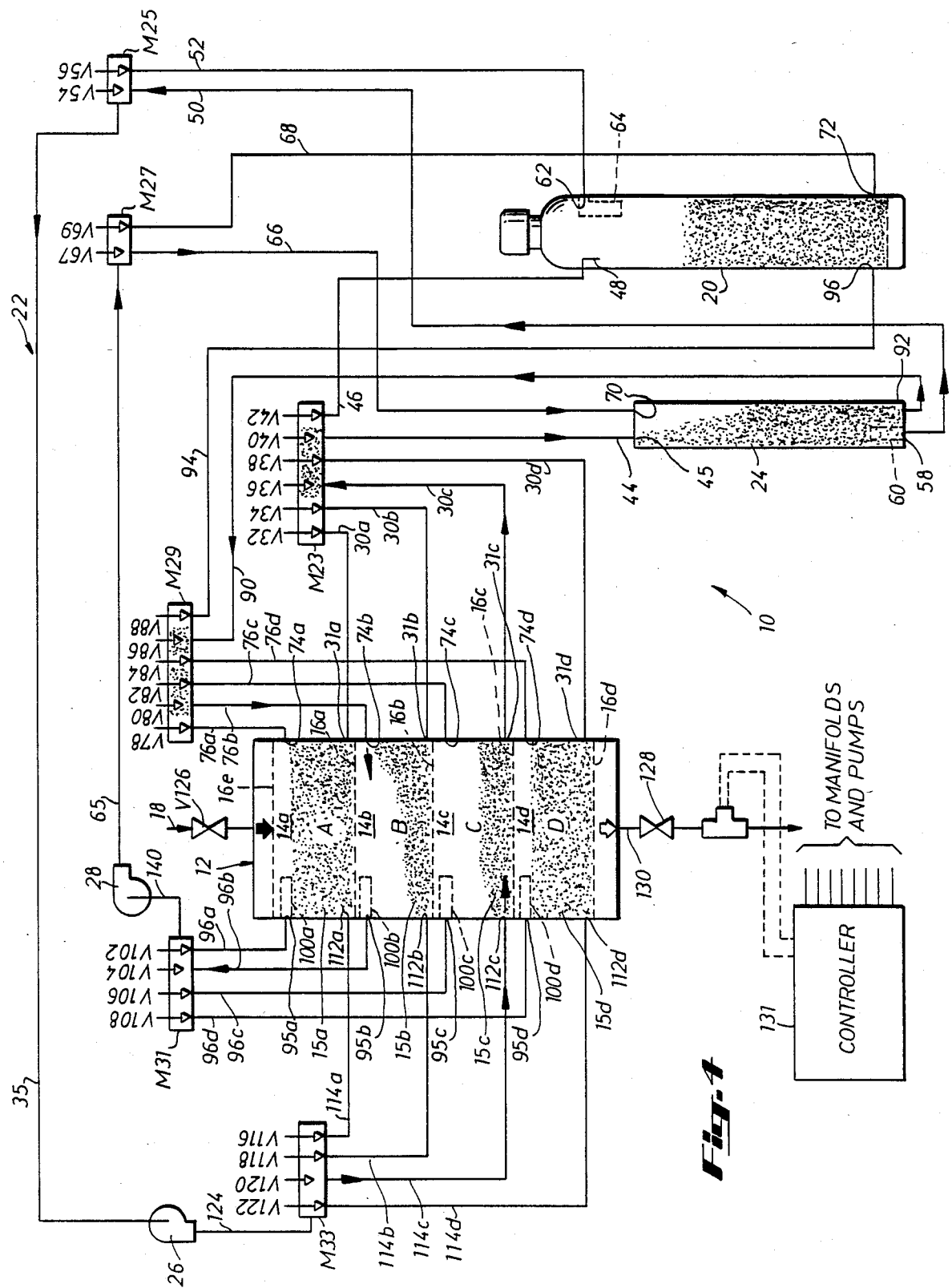
Figure 5:
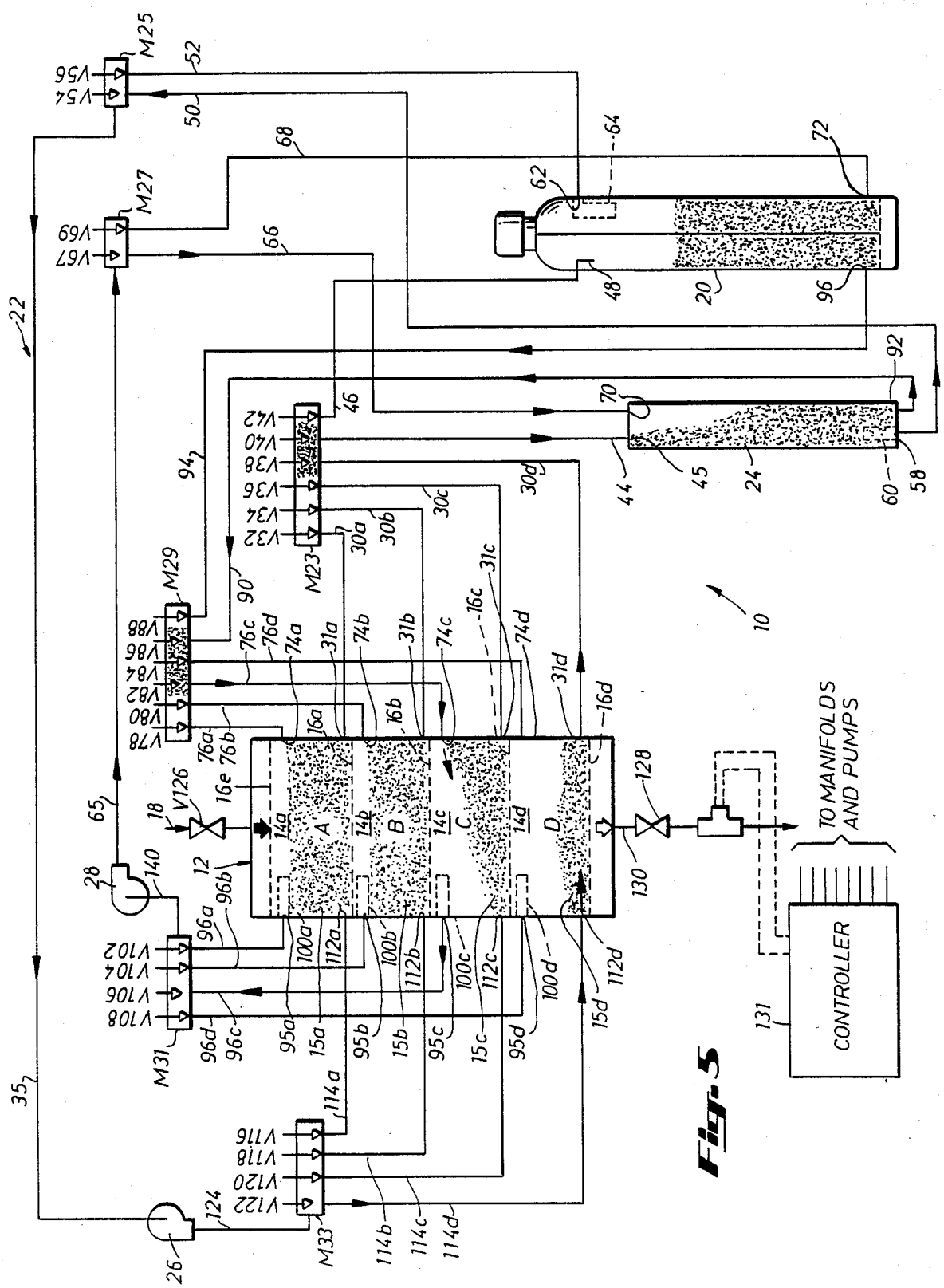

Referring now to FIG. 3, there is depicted a fluid treatment system 10 when resin slug 15b is being transferred from chamber 14b to chamber 14a. To accomplish this transfer, valves V34, V40, V54, V86, V102, and V118 are opened and pumps 26 and 28 are activated. The transfer operation proceeds as follows. Fluid from pump 26 passes through valve V118 and Fluid-In line 114b into chamber 14b in vessel 12. This fluid fluidizes the resin slug 15b which is then drawn through resin outlet line 30b, through manifold M23 and into transfer tank 24. Simultaneously, pump 28 will be drawing fluid from chamber 14a through Fluid-Out line 96a, and forcing the fluid through port 65 in manifold M27, line 66 and into transfer tank 24. Fluidized resin in transfer tank 24 will be drawn through resin outlet 92 and line 90, through manifold M29 and Resin-In line 76a into chamber 14a in column 12. Additional fluid in transfer tank 24 will be drawn through fluid exit 58, line 50 and manifold M25 and port 35 to supply pump 26.

Once the transfer of resin slug 15b to chamber 14a is complete, resin slug 15c may be transferred from chamber 14c to chamber 14b. To complete this transfer, again pumps 26 and 28 are actuated so that fluidized resin passes from chamber 14c in exchange vessel 12, through valves V36 and V40 in manifold M23 and into transfer tank 24. Resin passes from transfer tank 24, through line 90 and through valves V86 and V80 in manifold M29 and through Resin-In line 76b into chamber 14b. Simultaneously, fluid from chamber 14b passes through Fluid-Out line 96b, through valve V104, and is forced by pump 28 through port 65 and valve V67 in manifold M27 into transfer tank 24. Fluid then exits transfer tank 24 through fluid exit 58 and passes through line 50, and valve V54 and port 35 in manifold M25 to pass to the inlet of pump 26.

Resin may be transferred from chamber 14d to 14c through a similar operation. As can be seen from FIG. 5, this step is accomplished in a manner similar to that described with respect to the transfer from chamber 14c to 14b. To transfer fluid from chamber 14d to 14c, both pumps 26 and 28 will again be activated and the following valves will be opened: V52, V86 (in manifold M29), valves V38 and V40 (in manifold M23), valve V54 (in manifold M25), valve V67 (in manifold M27), valve V106 (in manifold M31), and valve V122 (in manifold M33).

Figure 6:
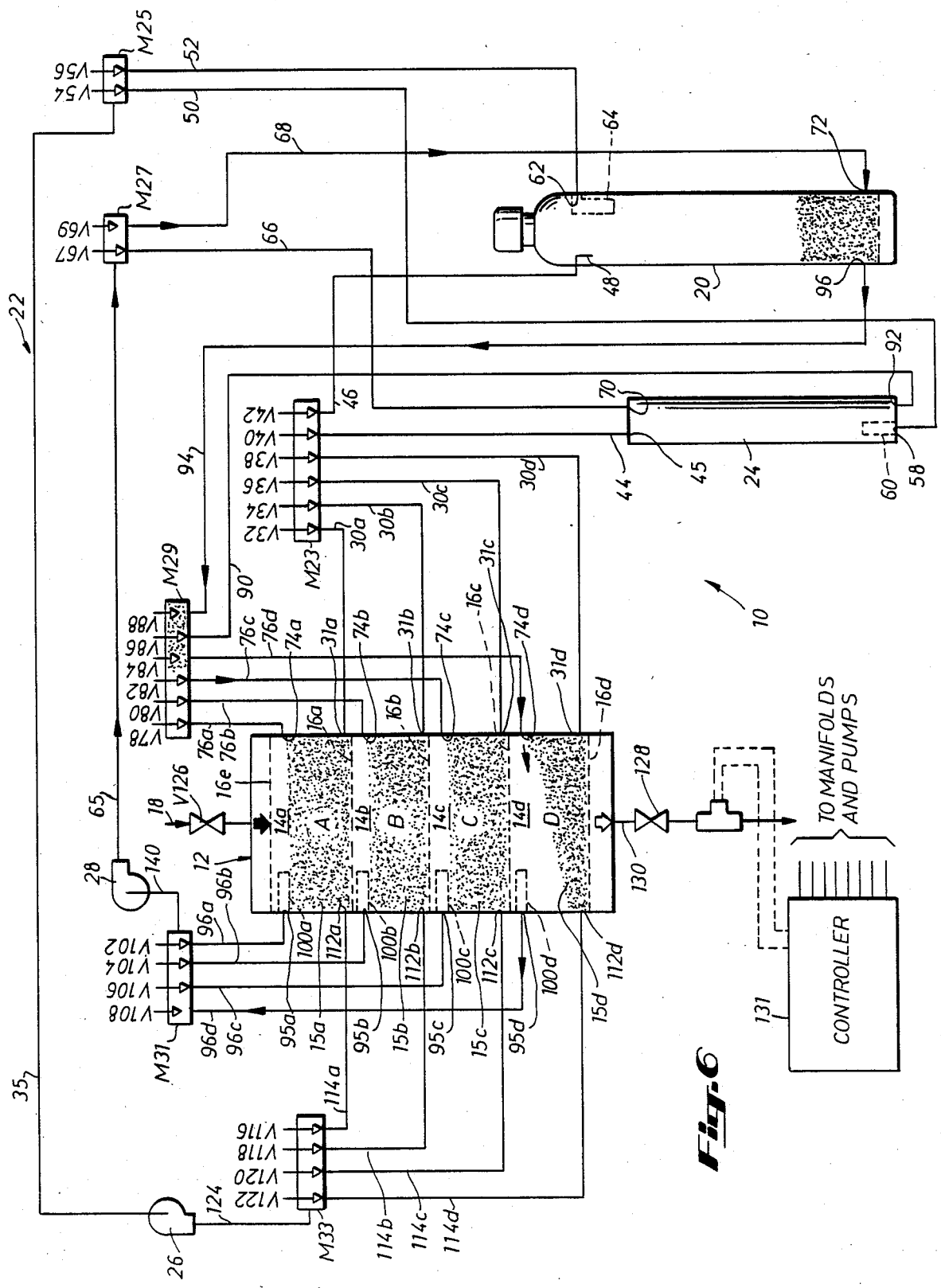

Referring now also to FIG. 6, once resin slugs 15b, 15c, and 15d have been transferred from chambers 14b, 14c, and 14d to chambers 14a, 14b, 14c, respectively, then the regenerated resin slug 15a may be transferred from regeneration tank 20 to chamber 14d. This transfer is accomplished by actuating pump 28 and by opening valves V69, V88, V84, and V108. This causes fluid to be drawn from chamber 14d through Fluid-Out line 96d and forced by pump 28, through port 65 and valve V69 into fluid inlet 72 of regeneration tank 20. This fluid fluidizes resin slug 15a in regeneration tank 20. The suction of pump 28 draws fluidized resin slug 15a out outlet 96, through line 94 and valves V88 and V84 in manifold M29 and into chamber 14d in exchange column 12. When the resin transfer is complete, then, again, all valves may be closed and pump 28 deactivated. When resin slug 15b in chamber 14a requires regeneration, then the above process may be repeated. Because system 10 is filled with fluid, the movement of fluid for the resin transfer operations does not affect the service flow output. Accordingly, all of these operations and subsequent resin transfers and regeneration operations may be accomplished without interrupting the services flow from system 10.

Figure 7:
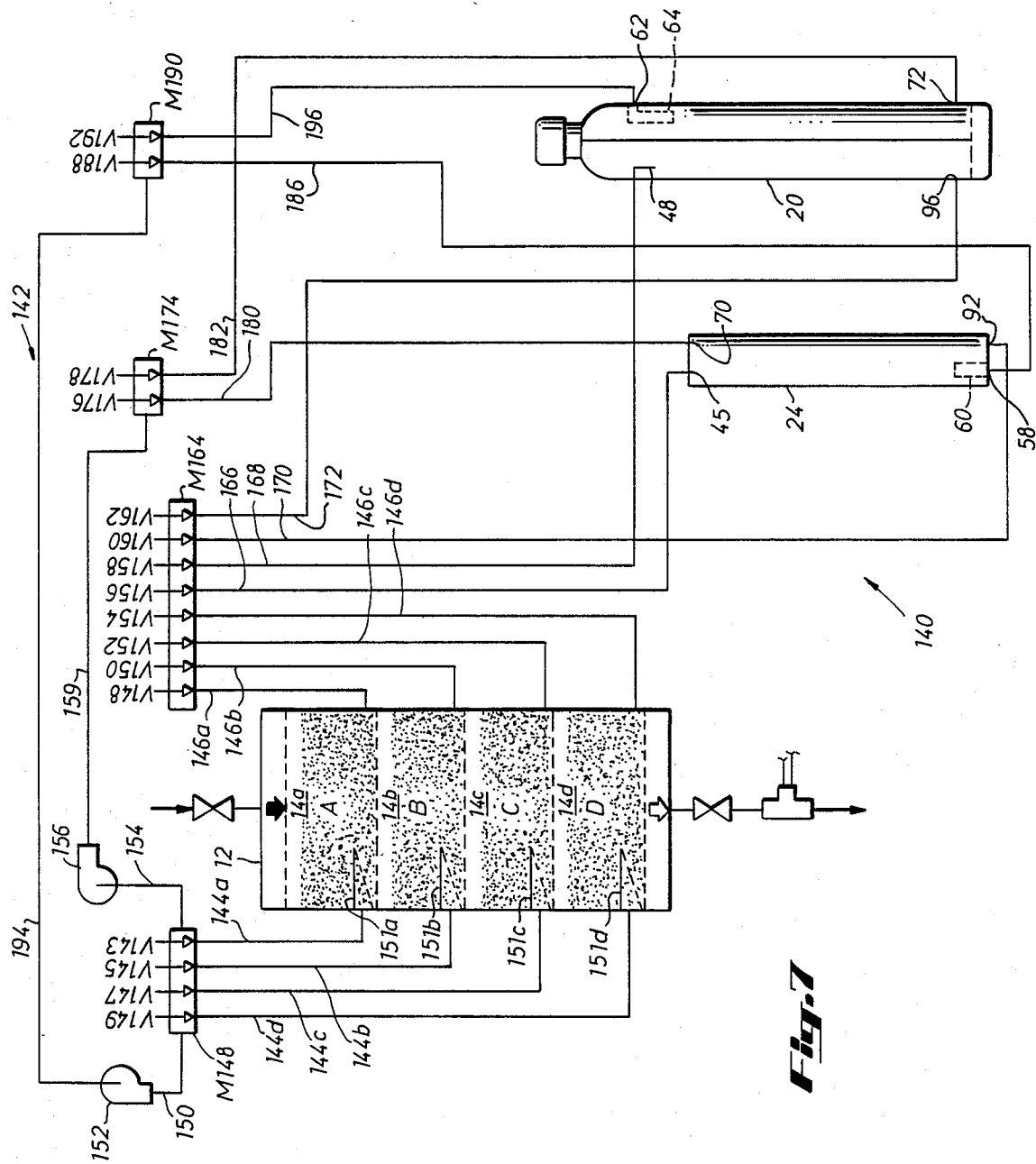
FIGS. 7-11 schematically depict an alternative second embodiment of a fluid treatment system in accordance with the present invention in various stages of one exemplary state of operation.

Referring now to FIG. 7, therein is depicted a fluid treatment system 140 including a modified fluid transfer system, indicated generally at 142. Fluid treatment system 140 includes the same exchange column 12 (with modified fluid inlets), regeneration tank 20 and transfer tank 24. Accordingly, these elements and their associated components are numbered similarly in this alternative embodiment. For clarity of explanation, all components in the transfer system, including the pumps, manifolds, valves, and conduits or lines are identified with previously unused numerals.

One difference presented between fluid treatment system 140 and fluid treatment system 10 is that communication with chambers 14a–14d in column 12 is accomplished through a single pair of lines per chamber, a first set of lines 144a–144, coupled, respectively, to each chamber 14a–14d, and a second pair of lines 146a–146d also coupled, respectively, to each chamber 14a–14d. Lines 144a–144d are all coupled to valves in manifold M141. Manifold M141 includes a first port 150 coupled to the outlet of a pump 152, and a second port 154 coupled to the inlet of pump 156. Lines 146a–146d are coupled to valves V148, V150, V152, and V154 in manifold M164. Manifold M164 also includes four additional valves, V156, V158, V160, and V162. Valve V156 is coupled through line 166 to inlet 45 of transfer tank 24. Valve V158 is coupled through line 168 to inlet 48 of regeneration tank 20. Valve V160 is coupled through line 170 to resin outlet 92 of transfer tank 24. Valve V162 is coupled through line 172 to resin outlet 96 of regeneration tank 20.

Manifold M141 includes four valves, V143, V145, V147, and V149 connected, respectively, to fluid inlet lines 144a–144d. Each line 144a–144d includes a strainer 151a–151d to prevent the passage of resin into each line. The outlet of pump 156 is coupled to port 159 of manifold M174 which includes valves V176 and V178. Valve V176 is coupled through line 180 to inlet 70 of transfer tank 24. Valve V178 is coupled through line 182 to inlet 72 of regeneration tank 20. Fluid exit 58 of transfer tank 24 is coupled through line 186 to valve V188 in manifold M190. Manifold M190 also includes valve V192 and an outlet port 194. Port 194 is coupled to the inlet of pump 152, while valve V192 is coupled through line 196 to fluid outlet 62 of regeneration tank 20.

Figure 8:
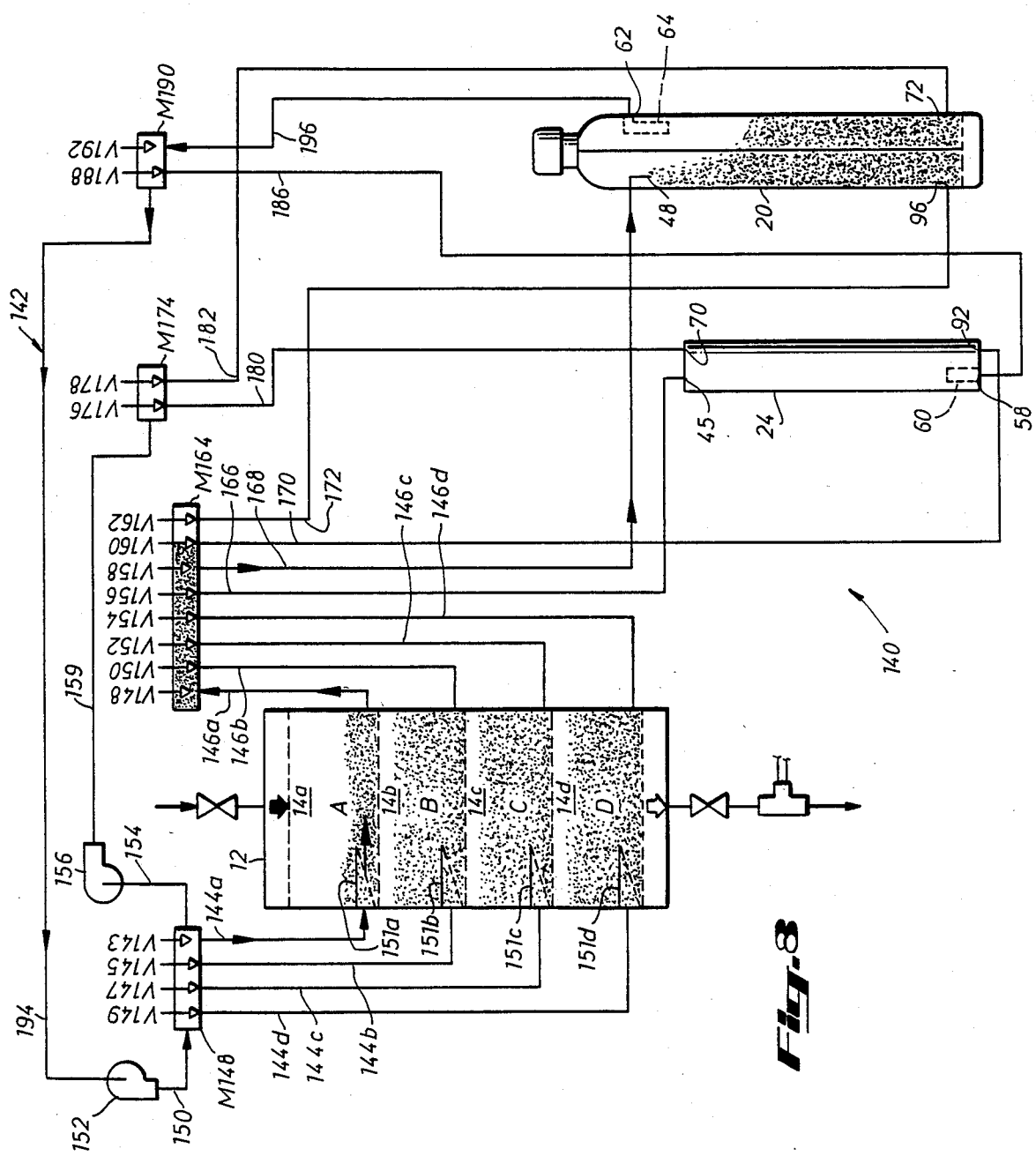

Referring now also to FIG. 8, when regeneration of resin slug 15a in chamber 14a is to take place, the resin slug is transferred to regeneration tank 20. The transfer of resin from chamber 14a to regeneration tank 20 is accomplished by activating pump 152 and opening valves V143, V148, V158, and V192. Fluid flows from pump 152, through manifold 148 and line 144a into chamber 14a, thereby fluidizing resin slug 15a. The suction of pump 152 pulls the fluidized resin out line 146a and manifold M164 and through line 168 into regeneration tank 20. Fluid then returns through line 196 and manifold M190 to the inlet of pump 152. When the resin transfer is completed, pump 152 is deactivated and the four aforementioned valves are closed.

Figure 9:
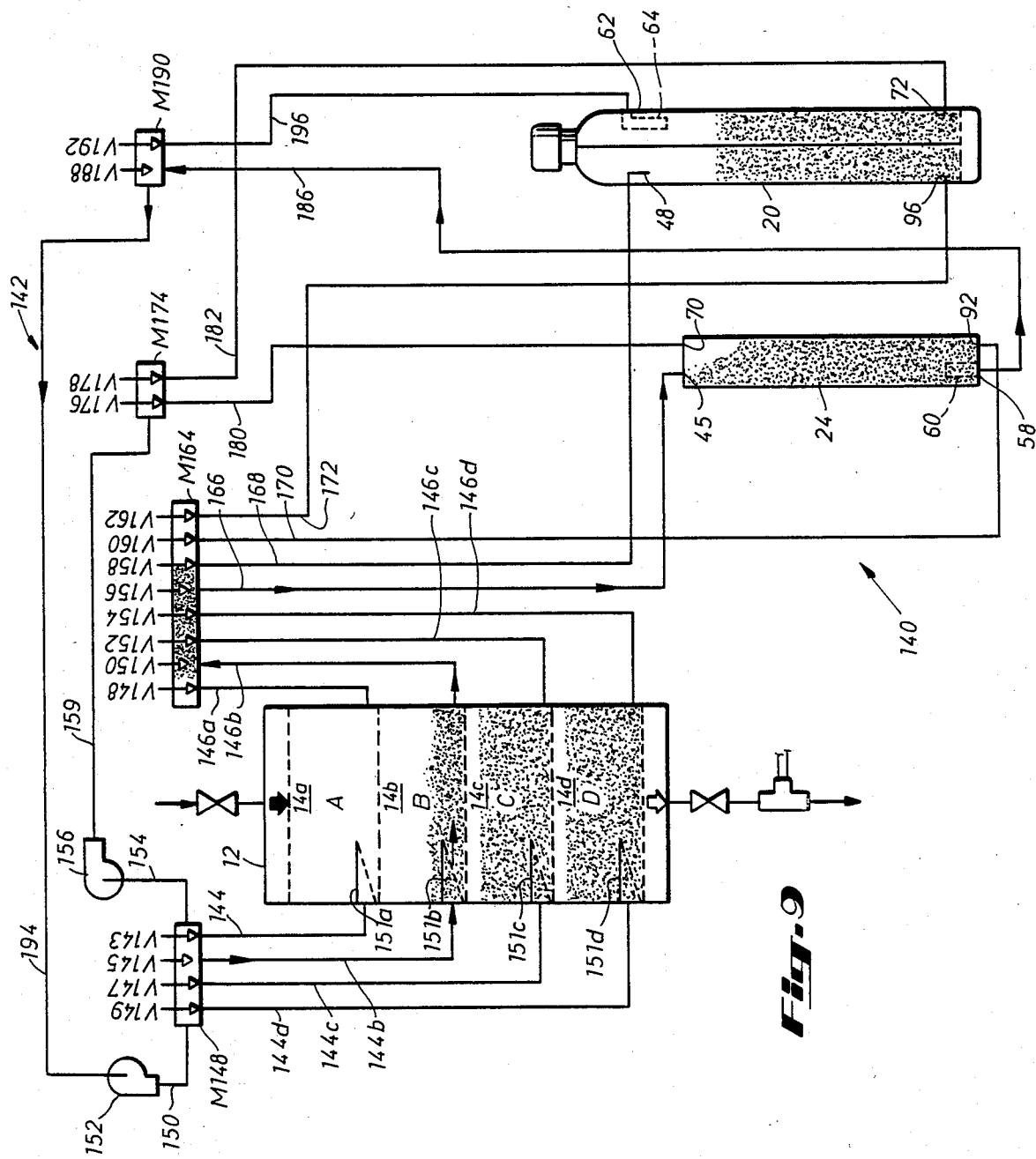

Referring now also to FIG. 9, as with the previous embodiment, once regeneration of fluid slug 15a is begun, it will typically be optimal to transfer the resin slugs in each chamber 14b–14d to the next highest chamber, 14a–14c. Transfer of resin slug 15b from chamber 14b to 14a is accomplished by activating pump 152 and opening valves V145, V150, V156, and V188. Fluid from pump 152 passes through manifold M141 and line 144b into chamber 14b, fluidizing resin slug 15b. The fluidized resin passes out line 146b, through manifold M164 and line 166 into transfer tank 24. Fluid then passes from transfer tank 24, through line 186, and manifold M190 to the inlet of pump 152. When all resin from chamber 14b is located in transfer tank 24, valves V145, V150, V156, and V188 are closed and pump 152 is deactivated.

Figure 10:
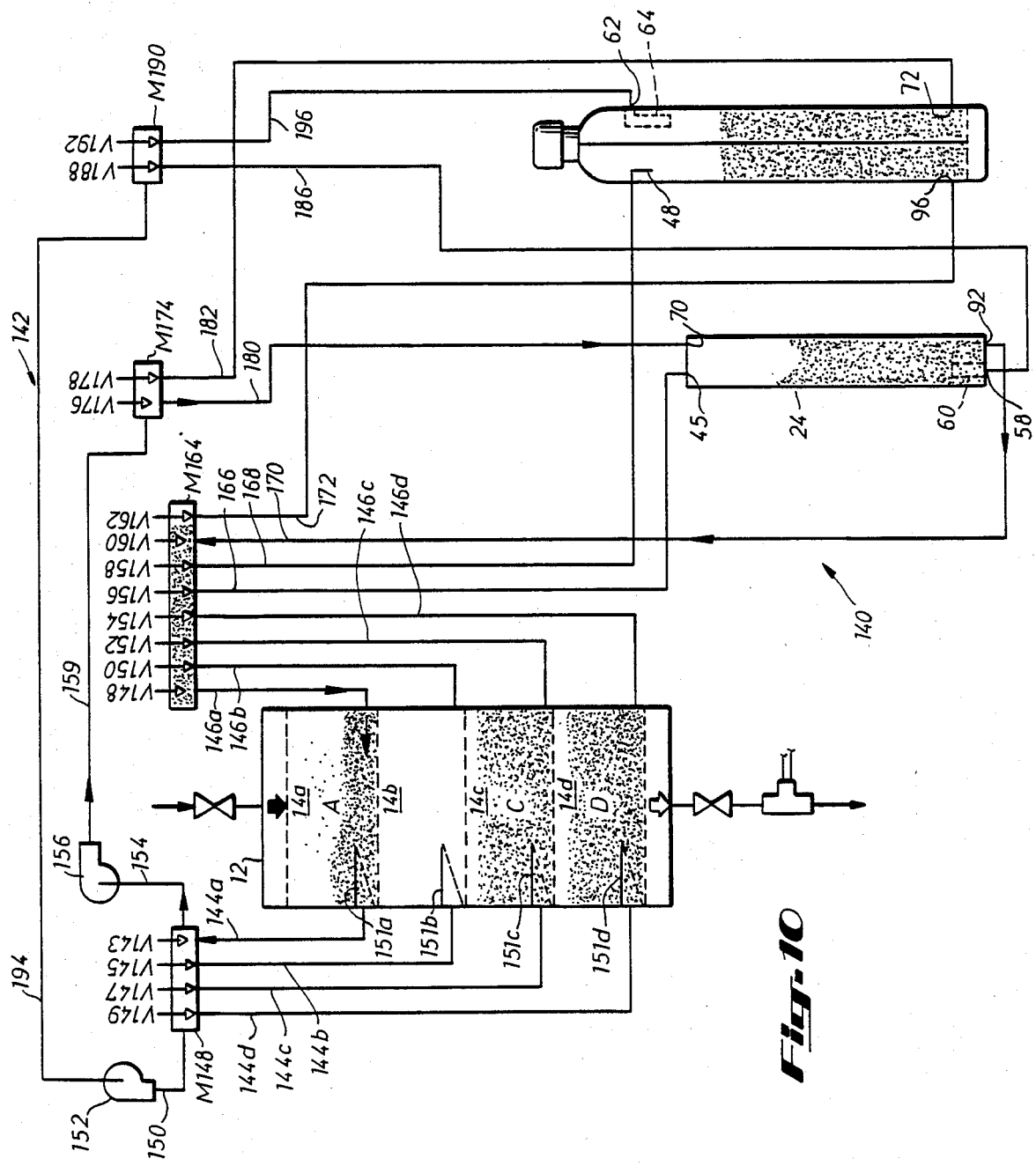

Referring now also to FIG. 10, to transfer the resin from transfer tank 24 to chamber 14a then, pump 156 is activated, and valves V143, V148, V176, and V160 are opened. Pump 156 then draws fluid from chamber 14a, forcing fluid through line 159, manifold M174 and line 180 into transfer tank 24, and simultaneously drawing resin in fluid transfer tank 24 through line 170, manifold M164 and line 146a into chamber 14a. While regeneration of resin slug 15a in regeneration tank 20 is taking place, resin can be transferred from chamber 14c to 14b and from chamber 14d to 14c, each transfer being performed in a manner similar to that just described.

Figure 11:
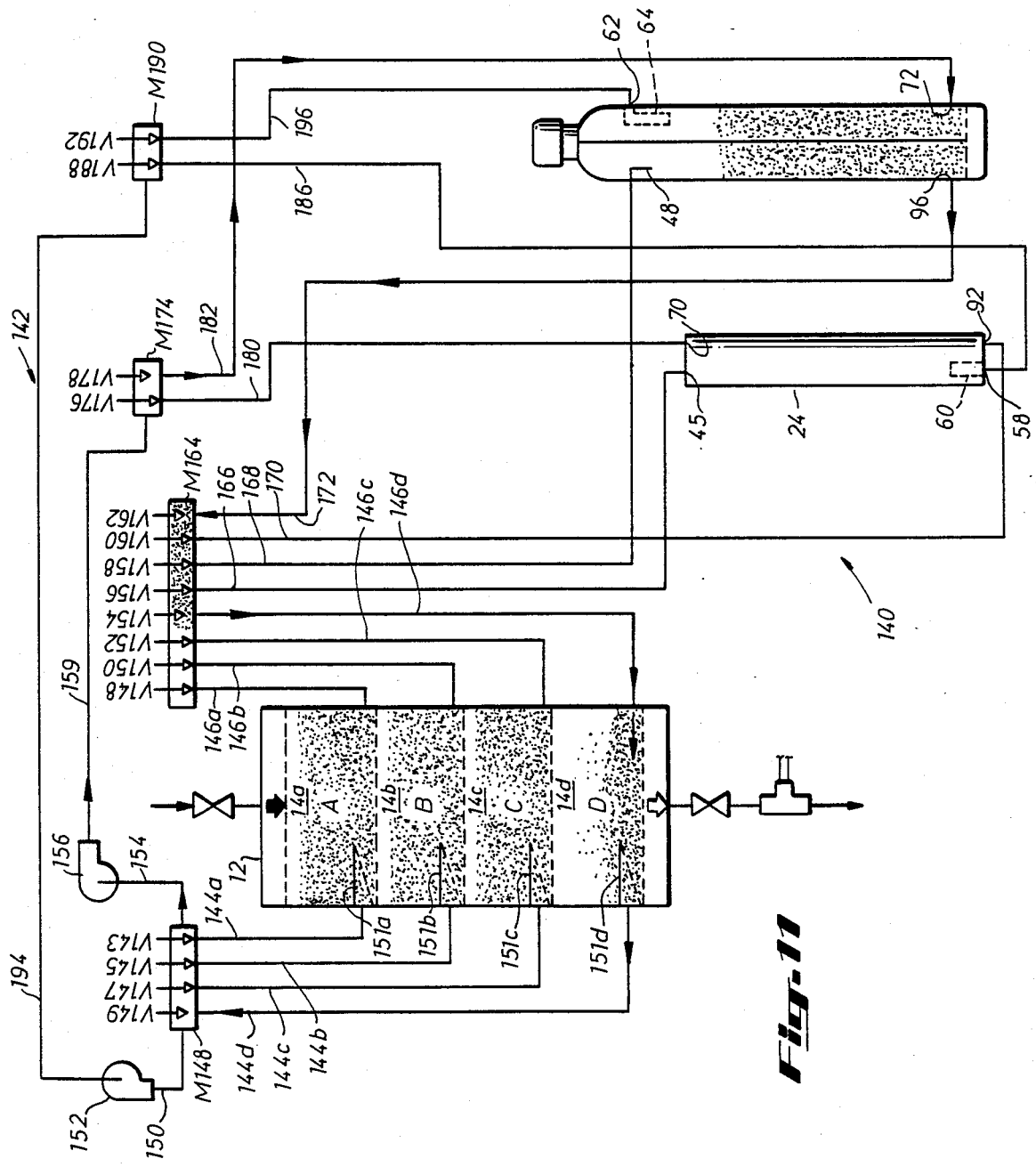

Referring now also to FIG. 11, therein is shown fluid treatment system 140 when regenerated resin slug 15a is being transferred from regeneration tank 20 to chamber 14d. The transfer is accomplished by activating pump 156 and by opening valves V178, V162, V154, and V149. Pump 156 draws fluid from line 144d through manifold M141, and forces the fluid through line 159, manifold M174 and line 182 into regeneration tank 20. Simultaneously, fluidized resin is drawn through line 184, manifold M164 and line 146d into chamber 14d until the resin transfer is complete.

Figure 12:
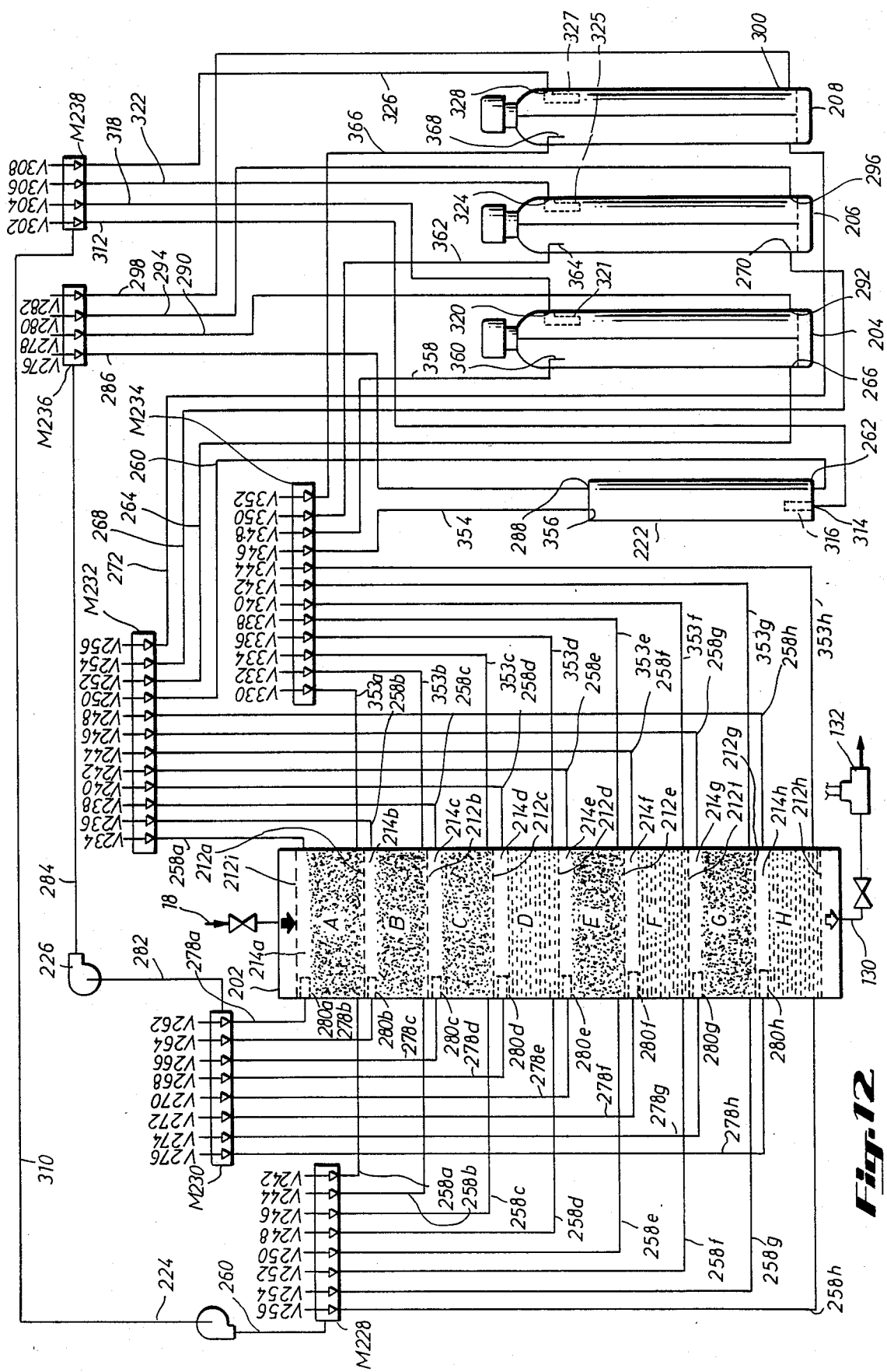
FIG. 12 schematically depicts an alternative third embodiment of a fluid treatment system in accordance with the present invention.
Figure 13:
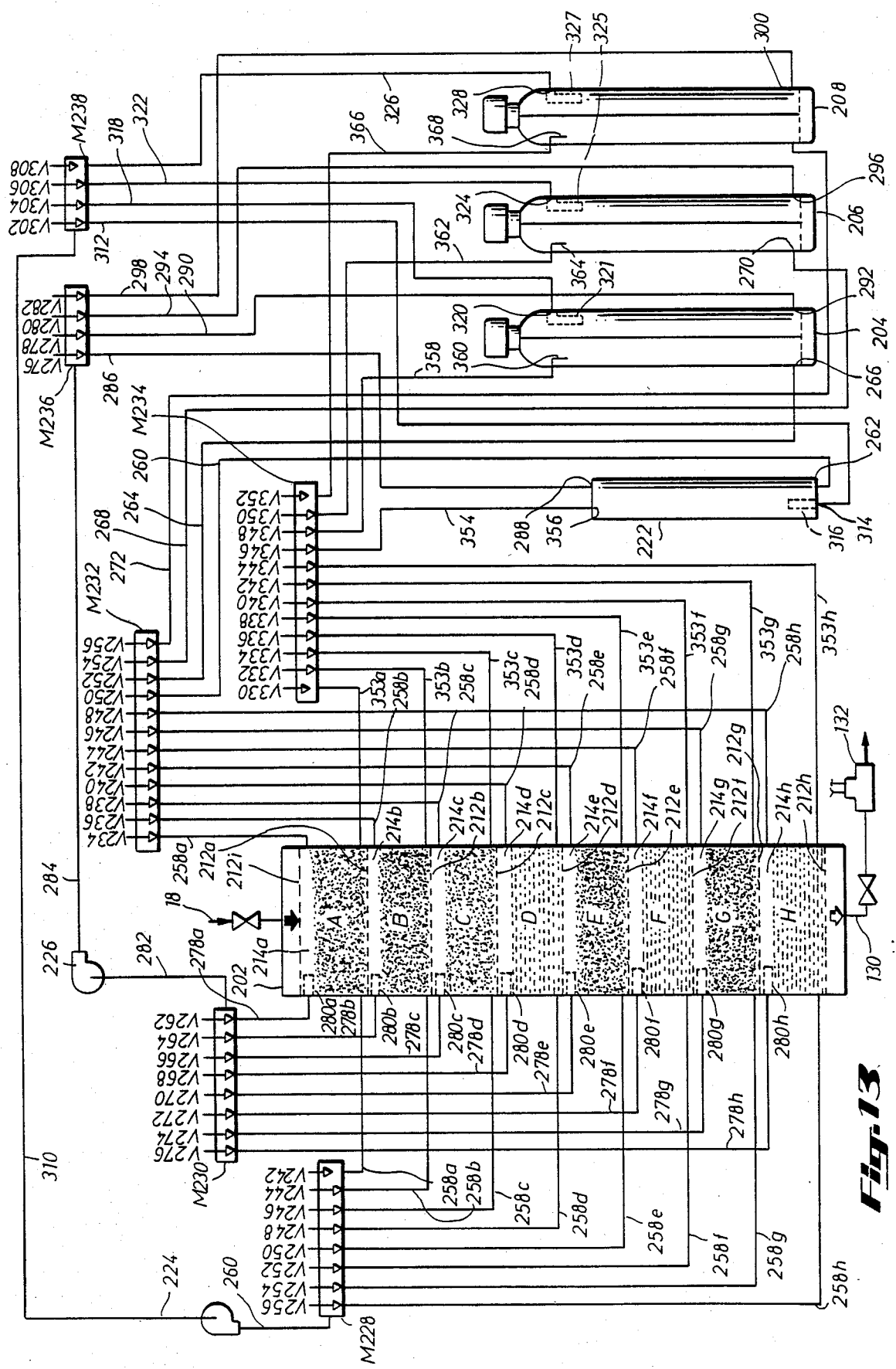
FIG. 13 depicts the fluid treatment system of FIG. 12, as contact media is being transferred from a chamber of the fluid treatment vessel into a media treatment vessel.

Referring now to FIGS. 12 and 13, therein is schematically depicted another embodiment of a water treatment system 200 in accordance with the present invention. Water treatment system 200 is of a type which would be especially suitable for operations such as deionizing water. In this type of operation, typically, a first resin will be used to remove cations from the water line and a second resin will be used to remove anions from the water. Additionally, as indicated earlier herein, often it is desirable to use a substance such as activated carbon as a pre-deionization treatment. Accordingly, fluid treatment system 200 represents one form of an apparatus for water deionization. Fluid treatment system 200 includes beds composed of three different contact media. In one optional embodiment as will be described here, these beds will include two beds of activated carbon and three beds of a cation exchange resin alternated with three beds of an anion exchange resin. The theory of transfer of the various contact media in system 200 is similar to that already described with respect to water treatment system 10 (FIGS. 1–6) and 140 (FIGS. 7–11). Accordingly, only exemplary operations will be described here.

Fluid treatment 200 includes exchange column 202, a cation regeneration tank 204, an anion regeneration tank 206, a backflush tank 208 and a fluid transfer system, indicated generally at 210.

Exchange column 202 is constructed similarly to exchange column 12 of FIGS. 1–7, the primary difference being that exchange vessel 202 includes nine aperture plates 212a–212i defining eight chambers 214a–214h. In the depicted embodiment, upper chambers 214a and 214b include beds formed of slugs of activated charcoal 216a, 216b, respectively. Chambers 214c, 214e, and 214g include beds formed of slugs of a first resin, such as a cation exchange resin 218a, 218b, 218c while chambers 214d, 214f and 214h include beds formed of a second resin, such as an anion exchange resin, 220a, 220b, 220c. Cation regeneration tank 204 and anion regeneration tank 206 are again conventional regeneration tanks. As discussed earlier herein, activated charcoal is not susceptible to being regenerated. However, activated charcoal often needs to be backflushed to remove particulate matter and organic impurities accumulated during treatment. Accordingly, backflush tank 208 is provided for this purpose. Backflush tank 208 will be essentially a conventional apparatus which need only have provisions for a backflushing operation. Backflush tank may be a conventional regeneration tank.

Fluid transfer system 210 includes transfer tank 222, pumps 224 and 226 and six manifolds, M228, M230, M232, M234, M236 and M238. Each manifold again includes a plurality of valves. Manifold M228 includes valves V242, V244, V246, V248, V250, V252, V254 and V256, which are each connected to lines 258a–258h, respectively. Manifold M228 also includes a port 260 coupled to the outlet of pump 224. If it is desired to keep the different contact media separate during transfers, multiple transfer tanks, one for each media, may be provided, coupled to the manifolds in the manner depicted for transfer tank 204.

Manifold M230 includes eight valves, V262, V264, V266, V268, V270, V272, V274 and V276 coupled respectively to fluid outlet lines 278a–278h. Each fluid outlet line 278a–278h is, again, protected by a strainer 280a–280h in its respective chamber 214a–214h in exchange column 202. Manifold M230 also includes port 282 coupled to the inlet of pump 226.

Manifold M232 includes valves V234, V236, V238, V240, V242, V244, V246, V248 coupled to resin inlet lines 258a–258h respectively. Manifold M232 also includes valves V250, V252, V254 and V256. Valve V250 is coupled to line 260 which is coupled to media outlet 262 of transfer vessel 222. Valve V252 is coupled to line 264 which is coupled to resin outlet 266 of cation regeneration tank 204. Valve V254 is coupled to line 268 which is coupled to resin outlet 270 of anion regeneration tank 206. Valve V256 is coupled to line 272 which is coupled to outlet 274 of backflush tank 208.

Manifold M236 includes valves V276, V278, V280 and V282. Manifold M236 also includes a port 284 coupled to the outlet of pump 226. Valve V276 is coupled through line 286 to fluid inlet 288 of transfer tank 222. Valve V278 is coupled through line 290 to fluid inlet 292 of cation regeneration tank 204. Valve V280 is coupled through line 294 to fluid inlet 296 of anion regeneration tank 206. Valve V282 is coupled through line 298 to fluid inlet 300 of backflush tank 208.

Manifold M238 includes valves V302, V304, V306 and V308. Manifold M238 also includes port 310 coupled to the inlet of pump 224. Valve V302 is coupled through line 312 to fluid outlet 314 of transfer tank 222. Valve V304 is coupled through line 318 to fluid outlet 320 of cation regeneration tank 204. Valve V306 is coupled through line 322 to fluid outlet 324 of anion regeneration tank 206. Valve V308 is coupled through line 326 to fluid outlet 328 of backflush tank 208. Fluid outlets 314, 320, 324, and 328 of transfer tank 222, cation regeneration tank 204, anion regeneration tank 206 and backflush tank 208 are each protected by strainers 316, 321, 325 and 327, respectively.

Manifold M234 includes valves V330, V332, V334, V336, V338, V340, V342 and V344 coupled to Media-Out lines 353a–353h, respectively. Manifold M234 also includes valves V346, V348, V350 and V352. Valve V346 is coupled through line 354 to media inlet 356 of transfer tank 222. Valve V348 is coupled through line 358 to resin inlet 360 of cation regeneration tank 204. Valve V350 is coupled through line 362 to resin inlet 364 of anion regeneration tank 206. Valve V352 is coupled through line 366 to media inlet 368 of backflush tank 208.

Referring now to FIG. 13, therein is depicted fluid treatment system 200 when activated carbon slug 216a is being transferred to backflush tank 208 for cleaning (i.e., backflushing). To accomplish this transfer, pump 224 is activated and valves V242, V330, V352 and V308 are opened. Fluid forced by pump 224 through manifold M228 and fluid inlet line 258a fluidizes the activated carbon in chamber 214A. Suction from pump 224 draws fluidized slug 216a through Media-Out line 353a, through manifold M234 and line 366 and into backflush tank 208. As with previous operation, once the transfer is complete, the valves can be closed and pump 224 deactivated. In the depicted embodiment, the activated carbon would preferably be returned to its original chamber in exchange column 202 after backflushing. Where only two beds of a particular media are utilized, there is typically no need to move the slugs from one bed to another. If an operator desired to progressively move the activated carbon beds toward the fluid inlet as one bed was being regenerated, it would be advantageous to add an additional bed of activated carbon. An additional bed of activated carbon would assure that while one bed was being backflushed and another bed was being transferred to the next highest chamber, there would still be a remaining bed of complete depth, remaining generally compacted, through which the influent would pass.

When the activated carbon is to be returned to chamber 214a, pump 226 would be activated and valves V262, V282, V256 and V234 would be opened. The cleansed activated carbon may then flow with the fluid along this path back into chamber 214A in exchange vessel 202.

The transfer and regeneration of the resins in chambers 214c–214h will be accomplished in a manner similar to that described with respect to the activated carbon in chambers 214a and 214b and with respect to the resin beds in fluid treatment system 10 of FIGS. 1–6. Those skilled in the art will recognize that cation resin slugs 218a, 218b, and 218c situated in chambers 214c, 214e, and 214g will be transferred to cation regeneration tank 204 for regeneration while the anion resin slugs 220a, 220b, and 220c in chambers 214d, 214f, and 214h will be transferred to anion regeneration tank 206 for regeneration.

Figure 14:
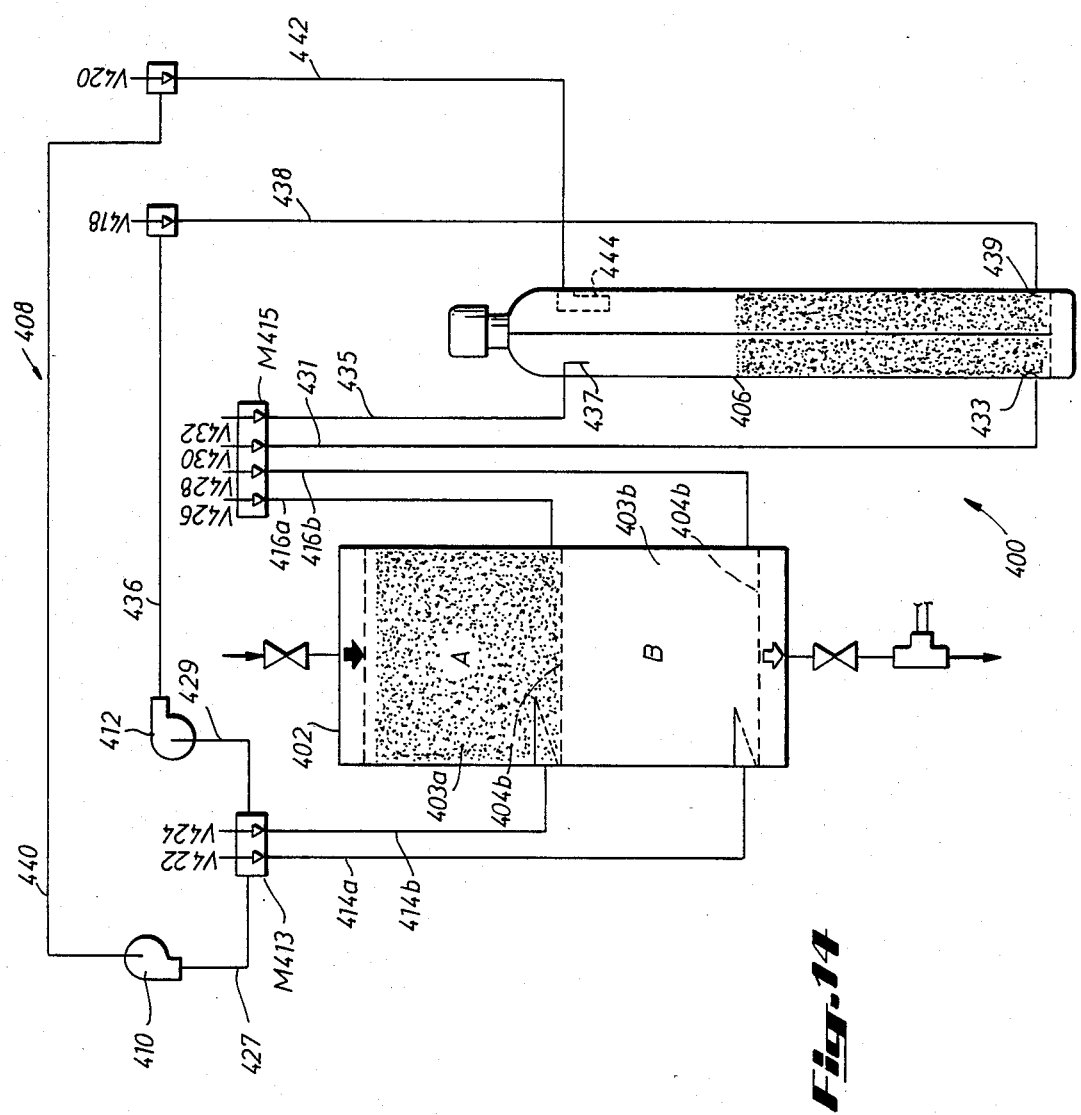
FIG. 14 schematically depicts an alternative fourth embodiment of a fluid treatment system in accordance with the present invention.

Referring now to FIG. 14, therein is depicted a fluid transfer system 400 such as might advantageously be utilized for conventional water softening operations where a single contact media is utilized. Water treatment system 400 includes an exchange column 402 including two vertically aligned chambers 403a, 403b, again defined by apertured plates 404a, 404b and 404c. Fluid treatment system 400 includes a regeneration tank 406 and a fluid transfer system indicated generally at 408. Fluid transfer system 408 includes pumps 410 and 412, manifold 413 and 415 and manifolds formed essentially of single valves 218 and 220. Because fluid treatment system 400 includes only two chambers 403a, 403b, and at least one section will be filled with the contact media at any one time, there is no advantage to be gained by transferring the media from one chamber to another and no transfer vessel is necessary. Fluid treatment system 400 is constructed similarly to system 140 of FIGS. 7–11 in that each chamber includes two access lines 414a, 414b and 416a, 416b. Manifold 413 includes two valves V422, V424, coupled respectively, to access line 414a and 414b. Manifold 413 includes a first port 427 coupled to the outlet of pump 410. Manifold 413 also includes a second port 429 coupled to the inlet of pump 412.

Manifold 415 includes valve V426, V428, V430, and V432. Valves V426 and V428 are coupled, respectively, to access line 416a and 416b. Valve V430 is coupled, through media line 431 to media outlet 433 or regeneration tank 406. Valve V432 is coupled through line V435 to media inlet 437 of regeneration tank 406. Single valve manifold 418 includes a port 436 coupled to the outlet of pump 412, and is connected to line 438 connected to fluid inlet 439 of regeneration tank 406. Single valve manifold 420 has a port 440 coupled to the inlet of pump 410, and is coupled to a line 442 which extends to fluid outlet 444 of regeneration tank 406. Fluid movement will be accomplished in a manner generally similar to that previously described, particularly with reference to the discussion of fluid treatment system 140 of FIGS. 7–11. When the contact media is to be moved from regeneration tank 406 to column 402, pump 412 will be activated and valve 418 will be opened, as well as the appropriate valve, V422 or V424, in manifold M413. Additionally, valve 430, and either valve V426 or V428 in manifold 415 will be opened. The action of pump 412 will then effect the media transfer. When the contact media is to be transferred from vessel 402A to regeneration tank 406, pump 410 will be activated, valves 420 and V432 will be opened along with the appropriate valves V426 or 428, and V422 or V424.

Many modifications and variations may be made in the techniques and structures described herein without departing from the spirit and scope of the present invention. Accordingly, the preceding description and figures are illustrative only and are not to be considered as limitations on the scope of the present invention.

I claim:

1. A fluid treatment system for contacting a fluid with contact media, comprising:
   a treatment vessel having a plurality of vertically aligned chambers, said chambers defined by apertured members adapted to retain a contact media within the chamber, each chamber for holding a slug of said contact media;
   a fluid inlet for untreated fluid to direct said untreated fluid proximate the top of the uppermost chamber of said plurality of chambers;
   a first media treatment tank for periodically treating slugs of said contact media;
   a first manifold;
   a first plurality of conduits, said conduits distributed to direct fluid between said first manifold and one of said chambers;
   a second manifold;
   a second plurality of conduits, said conduits distributed to direct fluid between said second manifold and one of said chambers;
   a third plurality of conduits distributed to direct fluid between said second manifold and said first media treatment tank;
   a first pump having its output communicatively coupled to said first manifold;
   a first valve coupled to said media treatment tank and to the input of said first pump, for controlling the flow of fluid out of said media treatment tank;
   a second valve coupled to said media treatment tank; and
   a second pump having an output coupled to said second valve, for controlling the flow of fluid into said media treatment tank.

2. The apparatus of claim 1, wherein said system further comprises a second media treatment tank and wherein said third plurality of conduits is further distributed to direct fluid between said second manifold and said second media treatment tank.

3. The apparatus of claim 2, wherein said system further comprises a third media treatment tank, and wherein said third plurality of conduits is further distributed to direct fluid between said second manifold and said third media treatment tank.

4. The apparatus of claim 1, further comprising a transfer vessel operatively coupled to said second manifold.

5. The apparatus of claim 1, wherein the input of said second pump is coupled to said first manifold.

6. The apparatus of claim 1, wherein each chamber of said treatment tank communicates with four conduits, and wherein one of said four conduits from each chamber communicates with a first manifold, and wherein a second of said four manifolds of each chamber communicates with said second manifold, and wherein said system further comprises a third manifold and a fourth manifold, and wherein a third of said four conduits communicates with said third manifold and the fourth of said four conduits communicates with said fourth manifold.

* * * * *